(12) United States Patent  
Mache et al.

(10) Patent No.: US 7,145,767 B2  
(45) Date of Patent: Dec. 5, 2006

(54) SUPPORT

(75) Inventors: Olivier Mache, Barcelona (ES); Jacques H Helot, Munich (DE); Vincent Tournadre, Vaulnaveys le Haut (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 10/706,046

(22) Filed: Nov. 13, 2003

(65) Prior Publication Data

US 2004/0150945 A1    Aug. 5, 2004

(30) Foreign Application Priority Data

Nov. 14, 2002    (EP) .................................. 02354174

(51) Int. Cl.
*G06F 1/16*    (2006.01)

(52) U.S. Cl. ........................................ 361/681; 361/683
(58) Field of Classification Search ................. 361/681
See application file for complete search history.

(56) References Cited

U.S. PATENT DOCUMENTS

| 5,978,211 | A | * | 11/1999 | Hong .......................... 361/683 |
| 5,987,211 | A | * | 11/1999 | Abecassis ..................... 386/46 |
| 6,024,335 | A | | 2/2000 | Min |
| 6,229,584 | B1 | | 5/2001 | Chuo et al. |
| 6,343,006 | B1 | | 1/2002 | Moscovitch et al. |
| 6,366,452 | B1 | | 4/2002 | Wang et al. |
| 6,366,453 | B1 | | 4/2002 | Wang et al. |
| 6,392,873 | B1 | | 5/2002 | Honda |
| 2003/0231460 | A1 | * | 12/2003 | Moscovitch |

* cited by examiner

*Primary Examiner*—Yean-Hsi Chang  
(74) *Attorney, Agent, or Firm*—Foley & Lardner LLP

(57) ABSTRACT

A display for a computer system comprising a display screen and a support for supporting the display screen,
  the support comprising a base and a column attached to the base,
  the column being provided with a screen support part and with at least one connector to which a module of the computer system may be connected.

13 Claims, 9 Drawing Sheets

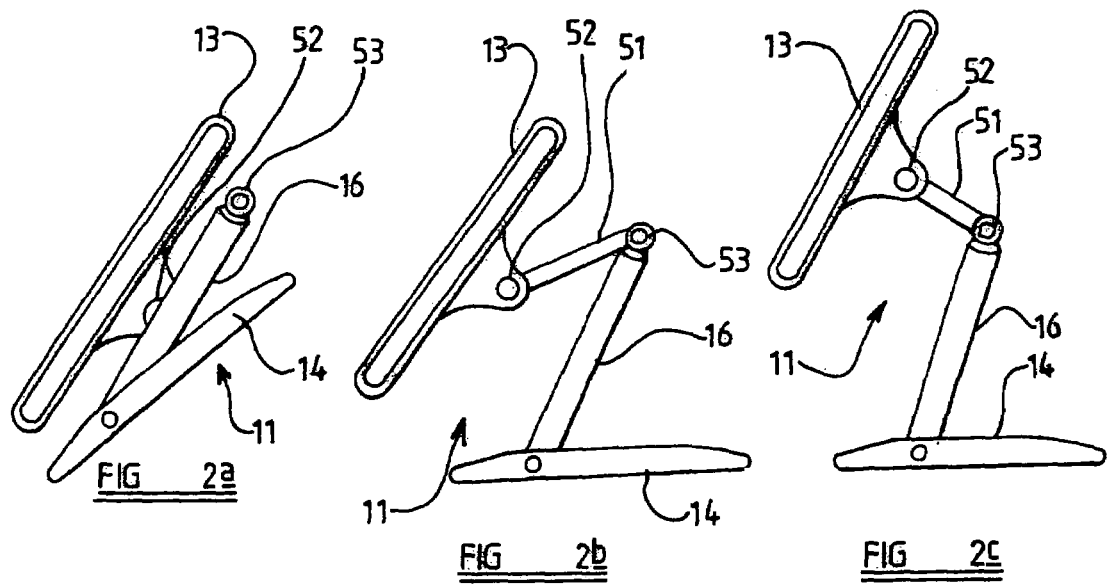
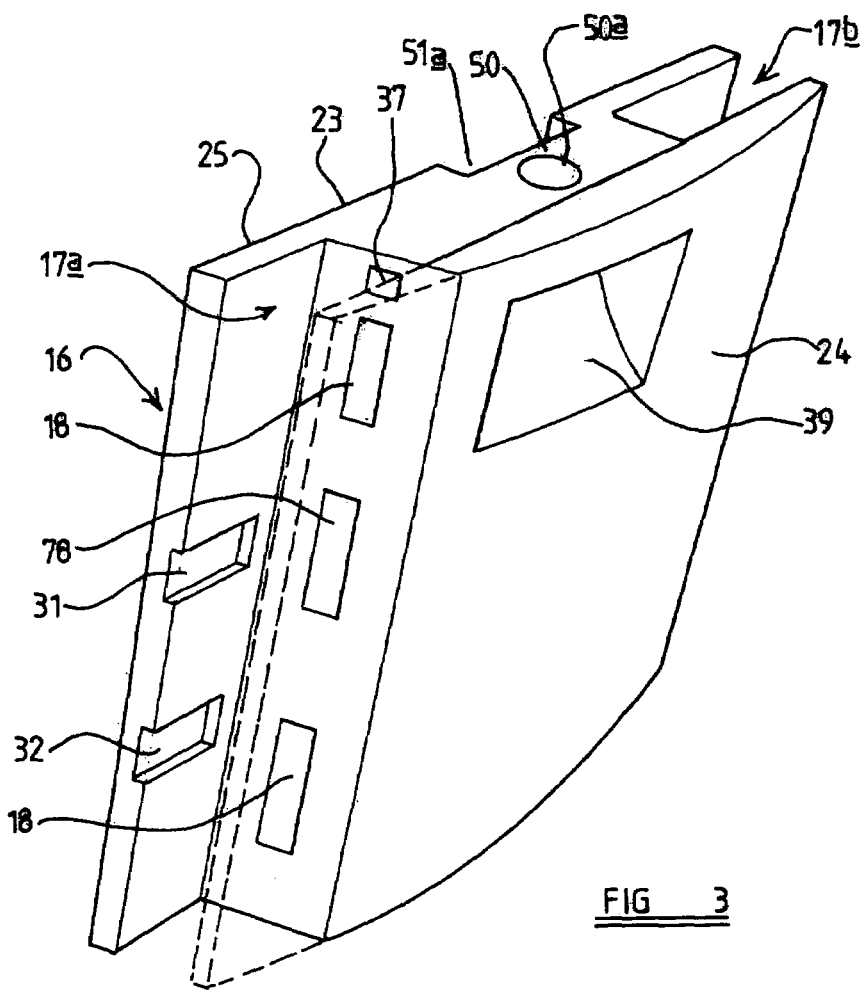

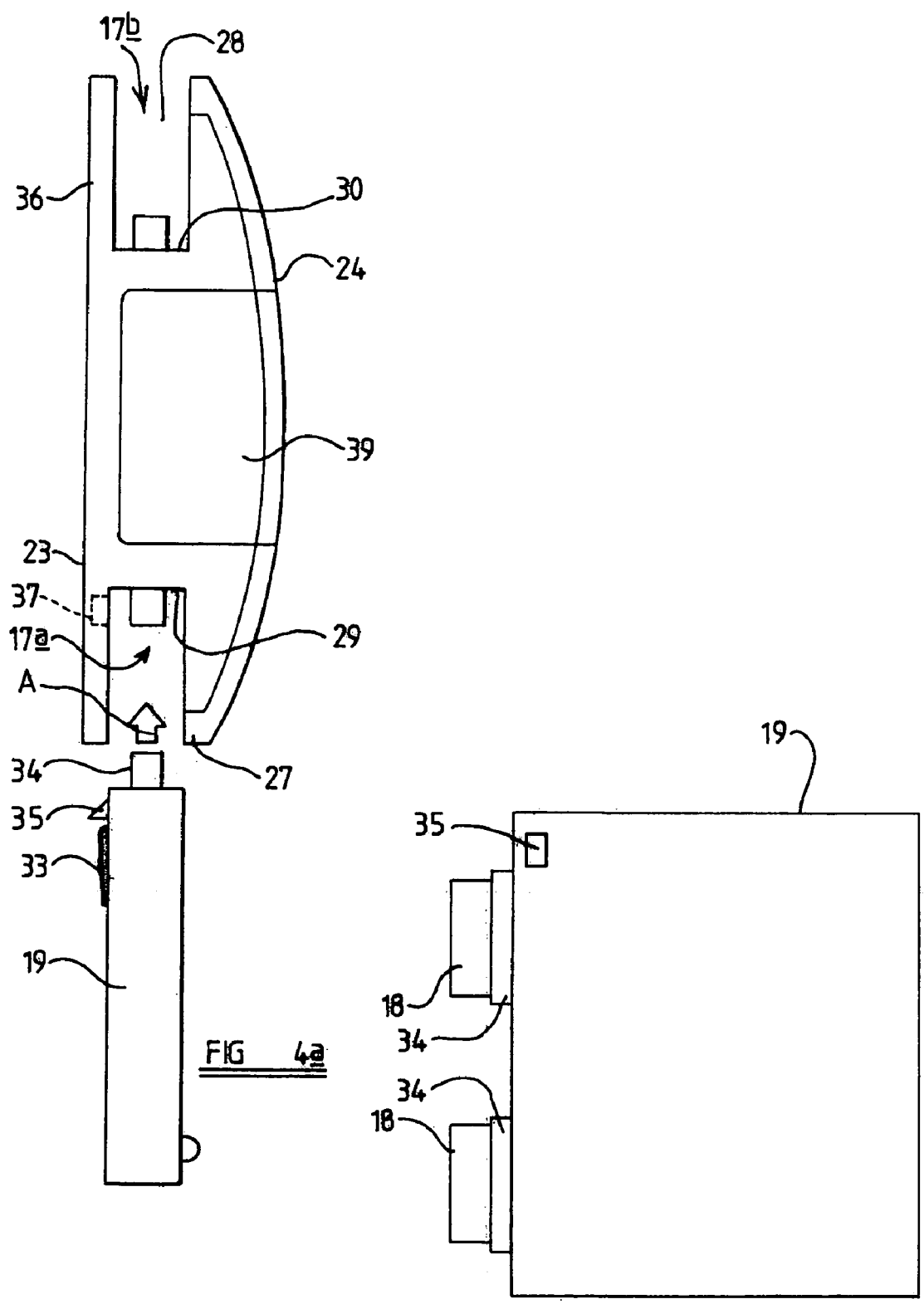

SUPPORT

DESCRIPTION OF INVENTION

This invention relates to a support for a display for a computer system, and a computer system comprising such a display.

BACKGROUND OF THE INVENTION

Computer systems, particularly personal computers, conventionally comprise a large number of peripherals and modules to provide a desired functionality to the system. A system may comprise, for example, a data storage medium, speakers and audio units, a USB hub, wireless connection module and indeed many other modules as desired. Where many modules are provided, a problem arises with the overall ergonomics, accessibility and aesthetics of the computer system. For example, a large number of modules may take up a large area of a desk, occupying a relatively large footprint, whilst bundles of cables and power supplies from the various modules can be unappealing and awkward to manage. For reasons for accessibility, for example such as access to controls or to a data storage medium, there is of necessity a balance between providing a discreet system with a small footprint and providing a multifunctional system with easy accessibility to the various modules.

It is known to provide small footprint computer systems such as Hewlett Packard's All-In-Two E-PC where a processor unit and a flat screen may be joined to provide a computer system with a small footprint with the processor unit behind the screen from a user's point of view. However, in this configuration, the disk drive bay, the power button and status LEDs of the processor unit are also located behind the screen and thus may not be as accessible or as visible as desired.

An aim of the present invention is to reduce or overcome one or more of the above problems.

SUMMARY OF THE INVENTION

According to a first aspect of the invention, we provide a display for a computer system comprising a display screen and a support for supporting the display screen, the support comprising a base and a column attached to the base, the column being provided with a screen support part and with at least one connector to which a module of the computer system may be connected.

The connector may be located such that when a module is connected thereto, the module is located at least partly behind the display screen.

The column may comprise opposed side faces and wherein a plurality of connectors may be located on each opposed side face.

The connectors may be connected to an output connection for communication with a processor unit of the computer system.

A processor unit may be provided in the support.

A power supply unit may be provided in the support.

Alternatively, a power supply unit may be located in a base module adjacent said column and behind said base.

The base may comprise a pair of rearwardly extending arms interconnected by a forward part, and wherein the column is connected to the forward part.

The power supply module may be adapted to be received in between the rearwardly extending arms.

The power supply module may be adapted to supply power to the display screen and any modules connected to the support.

The column may be foldably connected to the base.

The display screen support part may comprise a first rotating part located adjacent the column and a second pivotal connection in the vicinity of the screen whereby the support and screen support part may be folded into a collapsed configuration.

Such a configuration also allows for easy and flexible height adjustment of the display screen.

The column may be provided with a screen support part comprising a slidable connection whereby the display screen is vertically slideable relative to the column.

The display may further comprise at least one module engaged with a connector on the support.

According to a second aspect of the invention, we provide a computer system comprising a display according to the first aspect of the invention.

DESCRIPTION OF THE DRAWINGS

An embodiment of the present invention will now be described by way of example only with reference to the accompanying drawings, wherein;

FIG. 2a is a side view of the display of FIG. 1 in a folded position, FIG. 2b is a side view of the display of FIG. 1 in a partly unfolded configuration FIG. 2c is a side view of the display screen of FIG. 1 in an unfolded, operative position, FIG. 3 is a perspective view from one side and to the rear of part of the display of FIG. 1, FIG. 4a is a plan view, partly broken away, of part of FIG. 3 provided with a module, FIG. 4b is a broken away side view of the module of FIG. 4a, FIG. 5a is a diagrammatic illustration of a latch and connector of the module and connector of FIG. 1.

DESCRIPTION OF THE PREFERRED EMBODIMENTS

Figure 1:
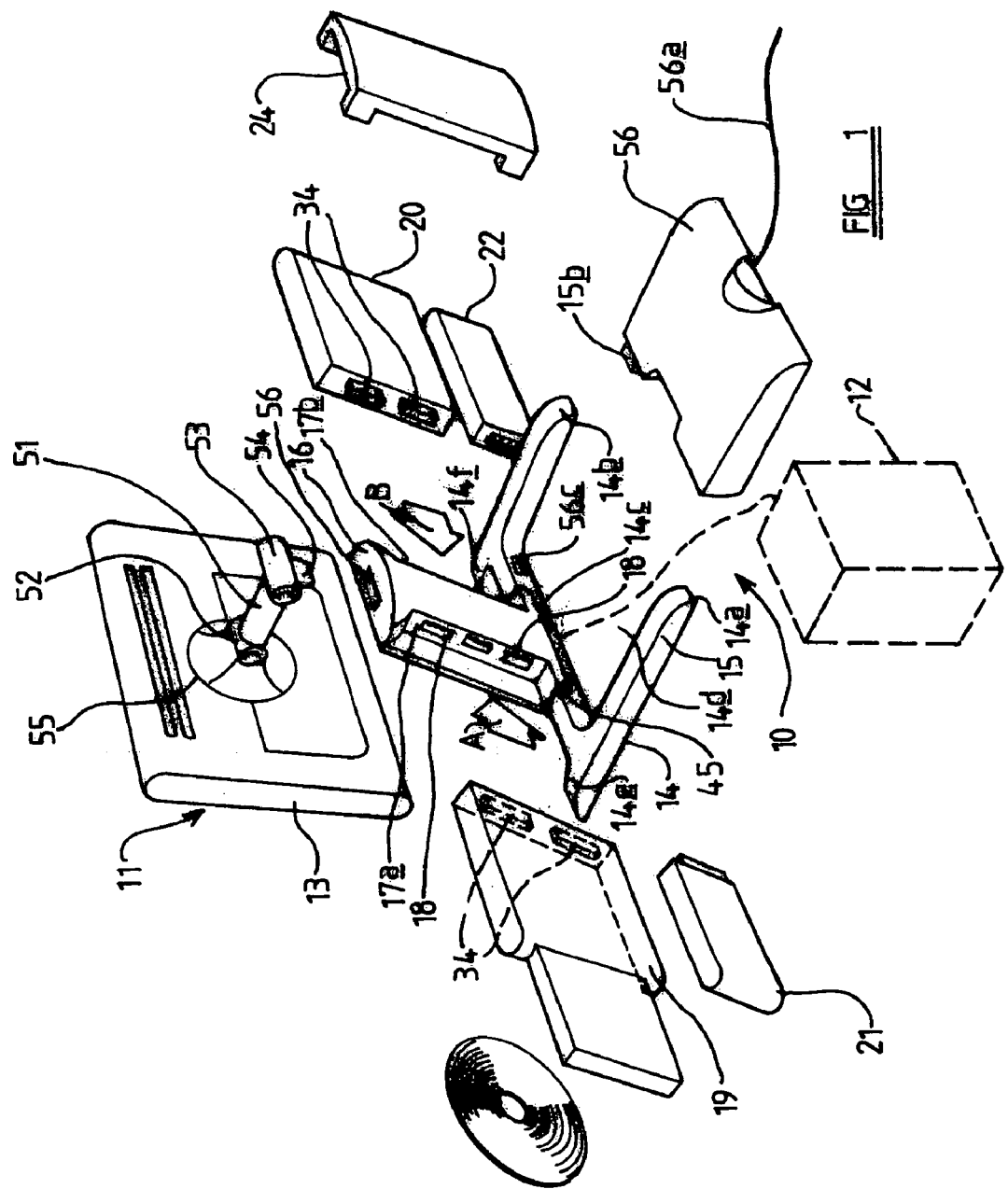
FIG. 1 is an exploded perspective view of a display embodying the present invention.

Referring now to FIG. 1, a computer system 10 is shown embodying the present invention. The computer system comprises a display 11, and shown in dashed outline a processor unit 12 which is provided with, for example, a motherboard having a CPU, memory, and a data storage drive such as a hard disk drive. The display 11 comprises a display screen 13 and a support 14. The support 14 comprises a base part 15 and an upwardly extending column 16. The column 16 comprises opposed side parts 17a, 17b, on which connectors 18 are provided. Modules 19, 20, 21, 22 to provide desired functions may be engaged with the connectors 18 by holding the modules in a generally vertical orientation as seen in FIG. 1 and by engaging the modules and connectors 18 in a generally horizontal direction as shown by arrows A and B.

As shown in FIGS. 3 and 4, the column 16 is provided with an inwardly directed hand hold 39 to enable the display 11 to be picked up.

As shown in FIG. 1, the base part 15 comprises a pair of rearwardly extending arms 14a, 14b, connected by a front part 14c in which a recess 45 is provided. The arms 14a, 14b and forward part 14c define a recess 14d in which a base module 56 may be located. This may be simply a box in which power supply units for the display 11 and the various modules may be neatly gathered. More preferably, the base module 56 comprises a power supply unit operable to receive an alternating current power input shown at 56a and having a DC power output connector 56b which is engagable with a DC power input connector 56c on the support 14 to supply DC power to the display screen 13 and to any modules connected to the column 16. For additional stability, a pair of forwardly extending arms 14e, 14f extend from the forward part 14c.

It will be apparent that a power supply unit may alternatively be provided in the support 14, in the base 15 or column 16 as appropriate.

In the present example the modules 21, 22 comprise removable speakers, the module 19 comprises an optical disk drive such as a DVD or CD-ROM and the module 20 comprises a wireless communication module such as a Bluetooth module. It will however be apparent that any module with any appropriate functionality may be provided as desired. The connection to the processor unit 12 may be a simple cable leading from each connector 18 to an appropriate connector on the processor unit 12, or alternatively some of appropriate general connection, such as a USB connection may be provided by the processor unit 12 and the display 11. It might even be envisaged that one of the modules, or even the support itself, be provided with a USB hub to facilitate communication between the screen 13, modules and the processor units 12. It will be apparent that the processor unit 12 may as appropriate be integrated with the support 14, into the base 15 and/or column 16 as appropriate. The column 16 may preferably act as a hub for any other connection as desired, for example a telephone connection, a supply of direct or alternating current, a USB connection and any other signal as desired so that the number of cables extending from the display 11 across a desk top is limited.

As seen in more detail in FIG. 3, the column 16 comprises a forward face 23 which is seen by the viewer when the display 11 is in use. The column 16 is further provided with a back part 24 which in the present example is removably detachable from the column 16 as desired. A pair of flanges 25, 26 of the front face 23 and the back plate 24 define recesses 27, 28 extending on either side of the column 16. The ends of the recesses are provided by side faces 29, 30 of the column and a plurality of connectors 18 are each provided on the faces 29, 30 with their long axes generally co-axial. In this example, guides 31, 32 are provided to engage a projecting part 33 of a module 19, 20, 21, 22 to guide the module 19 into position and to restrain movement of the module.

Figure 5A:
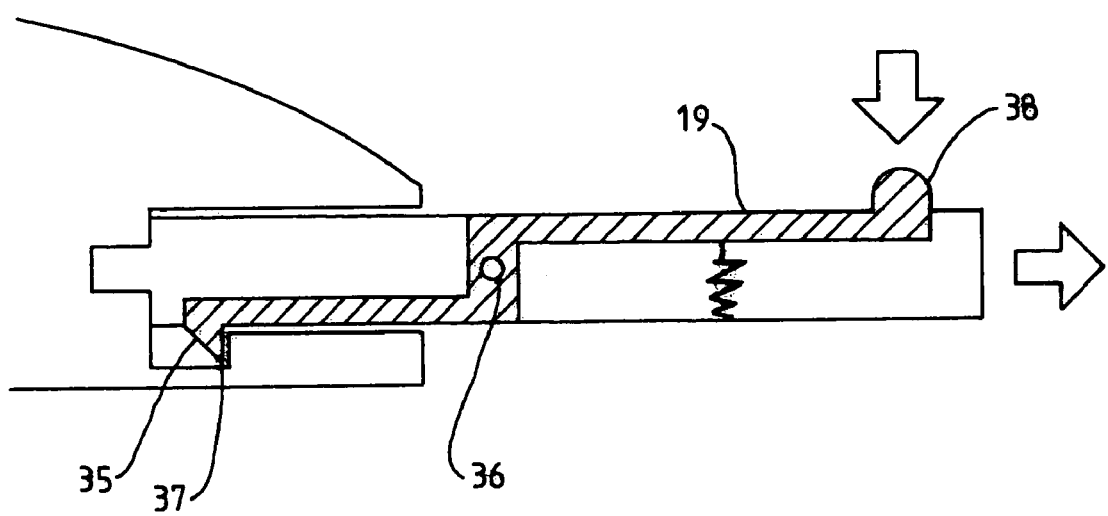
FIG. 5b is a perspective view of the module of FIG. 5a, FIG. 5c is a diagrammatic illustration of a further latch.

Suitable latches are provided to hold the module 19, 20, 21, 22 in place adjacent the face 29, 30. In the present example, as shown in FIGS. 3, 4a, 4b, 5a and 5b, the module 19, 20, 21, 22 is provided with a hook 35 pivotally attached at 36 to the module 19, 20, 21, 22 which is received in an aperture 37 of the side face 29 and engages a lip of the aperture 37. This thus acts to resist rotational force due to gravity which would cause module to rotate in a clockwise direction as seen in FIG. 5a causing the connectors 34 of the module 19 to rotate out of the sockets 18 and disengage the module from the column 16. To release the hook 35, a button 38 is provided on the module 19 connected to the hook 35 to release it from the aperture 37.

Figure 5B:
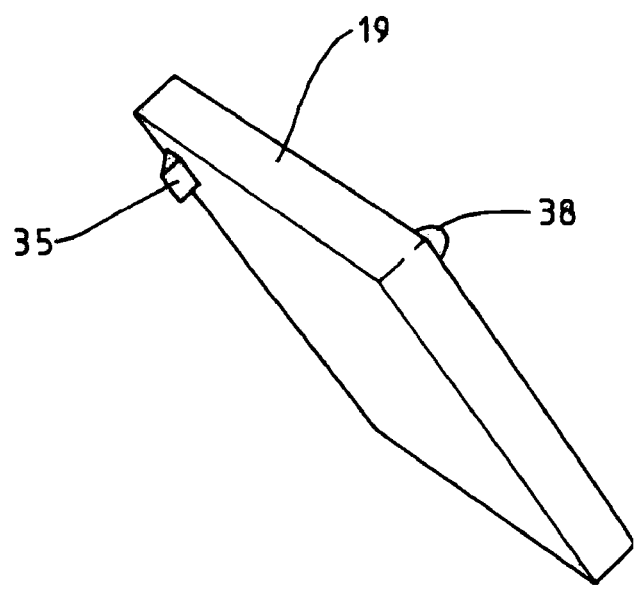
Figure 5C:
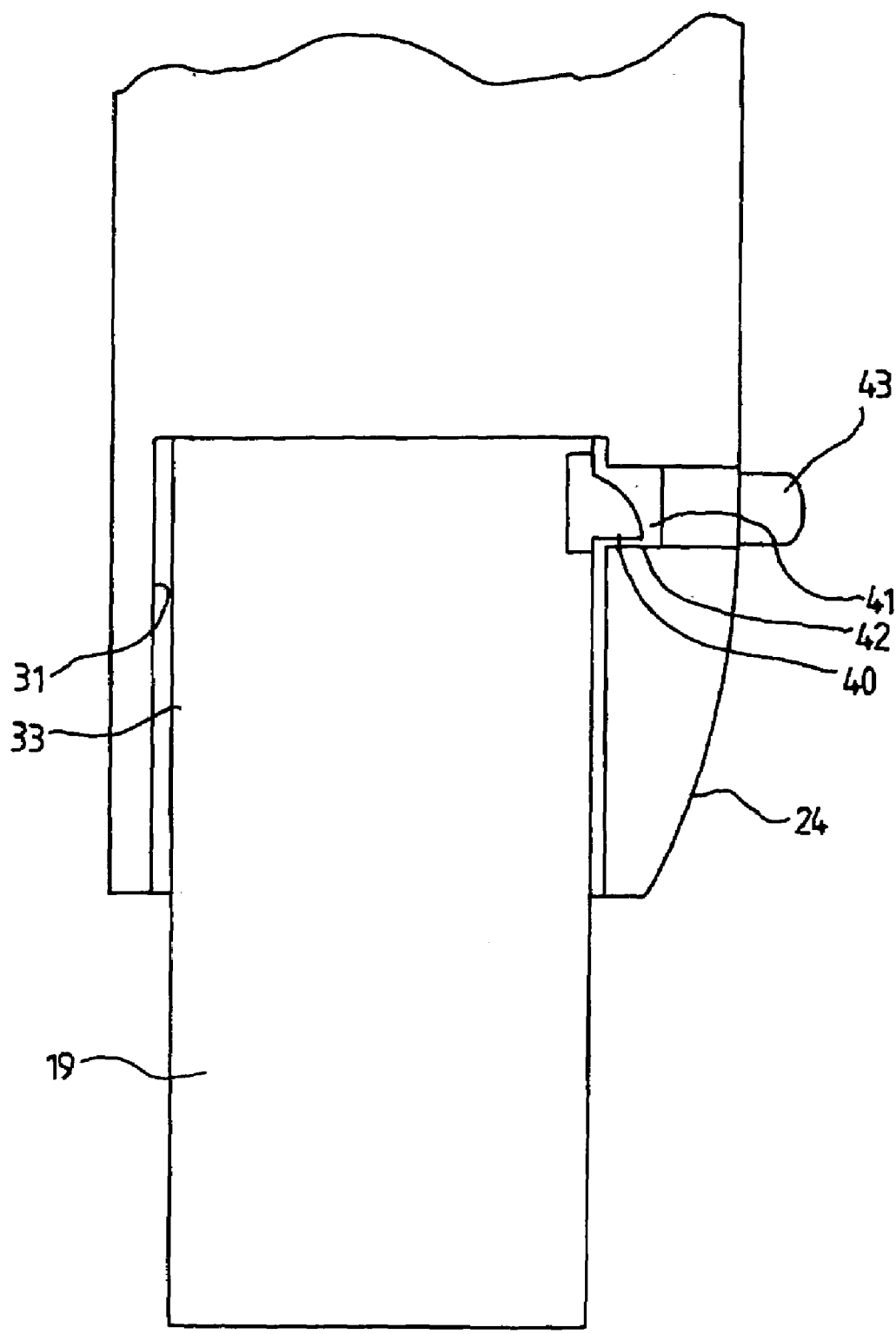

In addition, or alternatively, the module 19, 20, 21, 22 may be provided with an inwardly displaceable hook 40 on a rearward face thereof to engage an aperture 41 provided in the removable back plate 24 as shown in FIG. 5b to engage a face 42 of the aperture 41. In the example of FIG. 5b, the back plate 24 is further provided with a button 43 which may be depressed to urge the hook 40 to the left as shown in FIG. 5b such that the hook 40 is released from the aperture 41 and the module 19 may be released from the connector 18.

It will be apparent that any other latch or positive engagement means may be provided as desired.

Figure 6A:
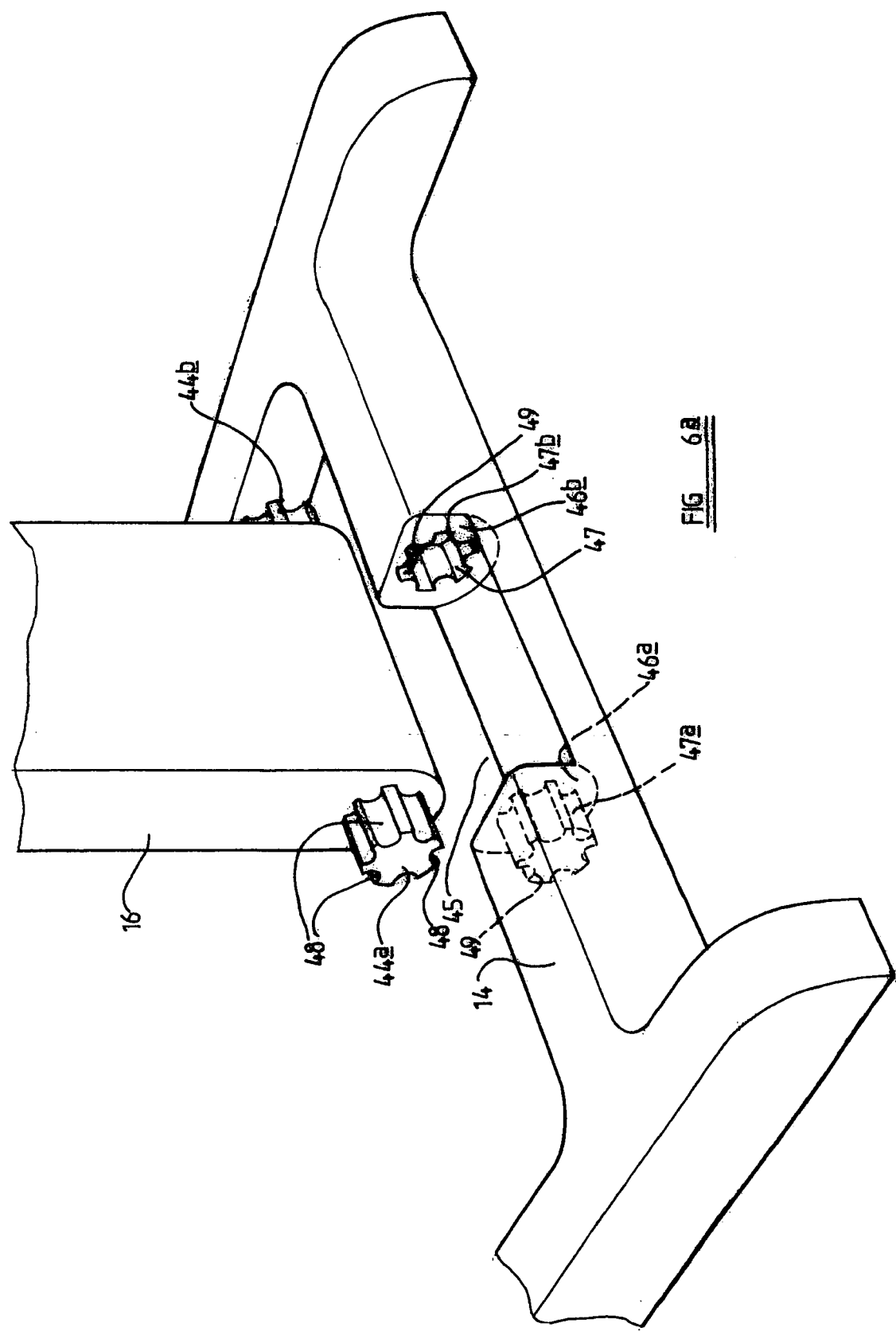
FIG. 6a is an exploded perspective view on a larger scale of part of the support of FIG. 1.

To enable the support 14 to be moved to a collapsed or folded position for ease of transportation, the column 16 is preferably pivotally connected to the base part 15. In the example of FIG. 6a, the lower part of the column 16 is provided at side faces thereof with a pair of co-axial outwardly extending cylindrical projections 44a, 44b. The base part 15 is provided with a recess 45 at a middle part thereof. The recess 45 has opposed inwardly directed faces 46a, 46b. In each face 46a, 46b is a generally cylindrical opening 47a, 47b in which the respective cylindrical projection 44a, 44b is received, providing a pivotal connection between the base part 15 and the column 16. In the example of FIG. 6a, to provide for the column 16 to be pivotal movable between a selected one of a plurality of preferred positions, each cylindrical projection 44a, 44b has a plurality of circumferentially spaced indentations. Each aperture 47a, 47b similarly has a number of inwardly directed ridges 49 which are shaped to engage the indentations 48. When the column 16 is rotated relative to the base 14, the user will feel a resistance as the column is rotated such that the indentations 48 are moved out of engagement with the one or more ridges 49, and then a positive engagement and potentially an audible click as the indentations 48 reengage with the ridges 49 in a next position.

Figure 6B:
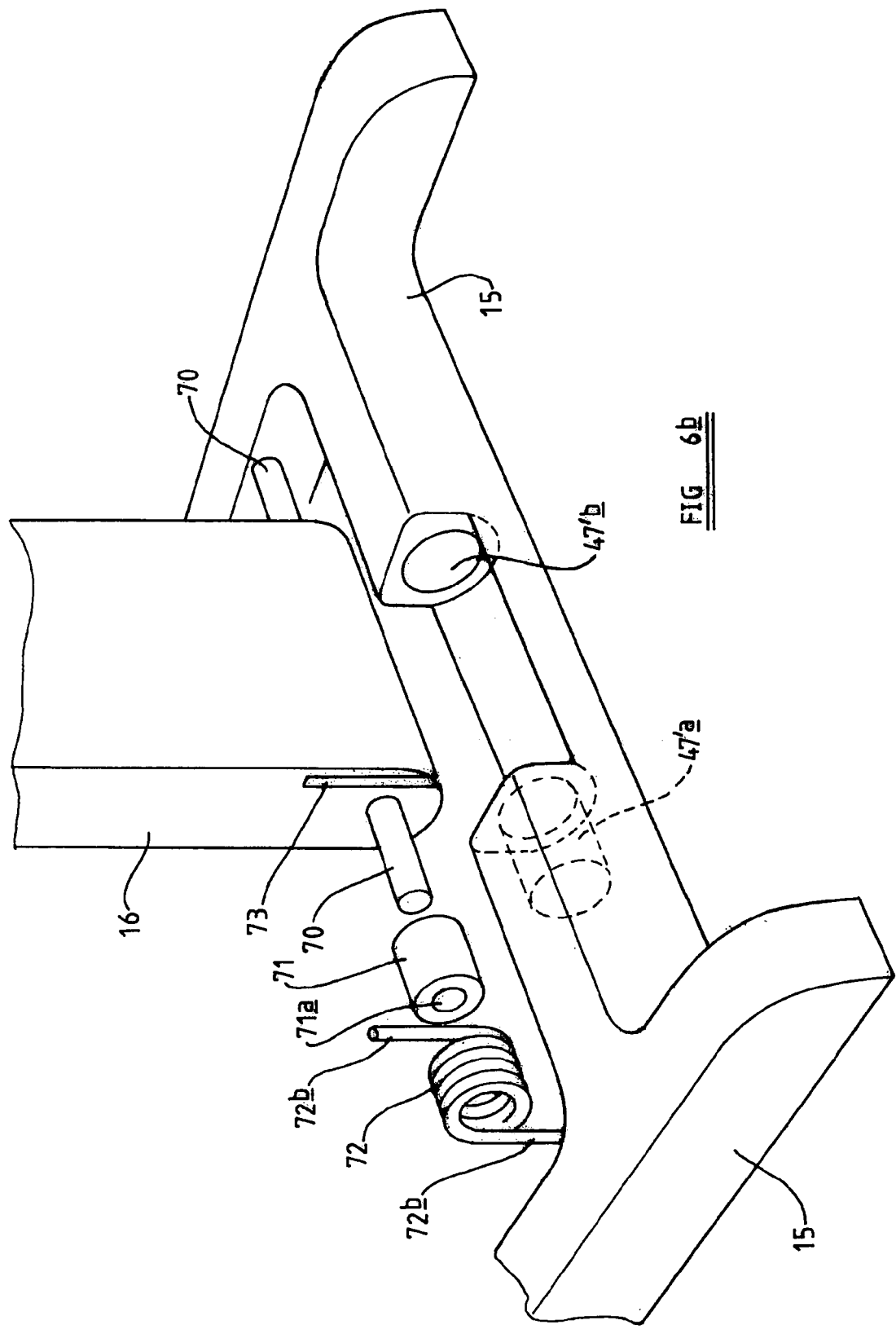
FIG. 6b is a perspective view of on a larger scale of part of an alternative support.

Of course, it will be apparent that any appropriate pivotal connection between the column 16 and base part 15 may be provided as desired. For example, in the alternative of FIG. 6b the cylindrical openings 47'a, 47'b are not provided with inwardly directed ridges. Instead, in this embodiment the column 16 is provided with outwardly directed metal posts 70 on which are received a cylinder 71 made of a plastics material. A helical spring 72 is disposed around the cylinder 71. A first end part 72a of the spring engages a slot 73 provided in the side wall of the column 15. The assembly of the cylinder 71 and spring 76 is received in a cylindrical recess 47'a, wherein the other end 72b of the spring 72 will engage the base part 15. When the display is assembled, i.e. where a plastics cylinder 71 and spring 72 has been mounted on each metal peg 70, and the respective cylinder and spring being received in the respective cylindrical opening 47'a, 47'b, it will be apparent that the column 16 will be pivotally movable relative to the base part 70 against the frictional resistance between the metal peg 70 and the aperture of the cylindrical part 71, whilst the spring 72 resists movement of the column 16 and base part 15 towards a folded, stored position, and assists in overcoming the frictional engagement between the metal peg 70 and the plastics cylinder 71. The plastics cylinder 71 has an aperture 71a in which the metal peg 70 is received the metal peg 70 is slightly too large for the aperture 71a, such that there is a frictional resistance to relative movement between the cylinder 71 and the peg 70. By virtue of frictional engagement between the spring 72, the generally cylindrical opening 71a and the cylinder 71, there is also frictional resistance to relative movement between the cylinder 71 and the spring 72.

Figure 6C:
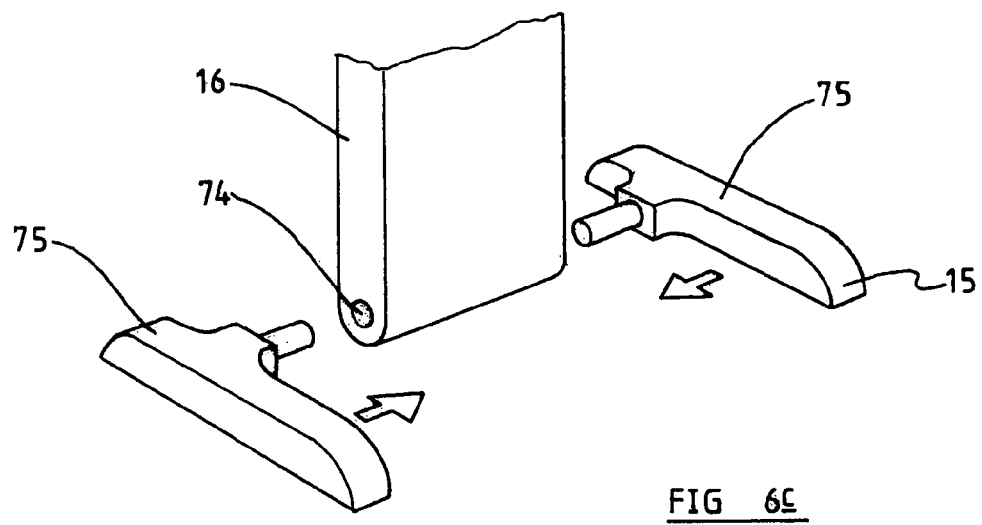
FIG. 6c is a perspective view of a further support.
Figure 6D:
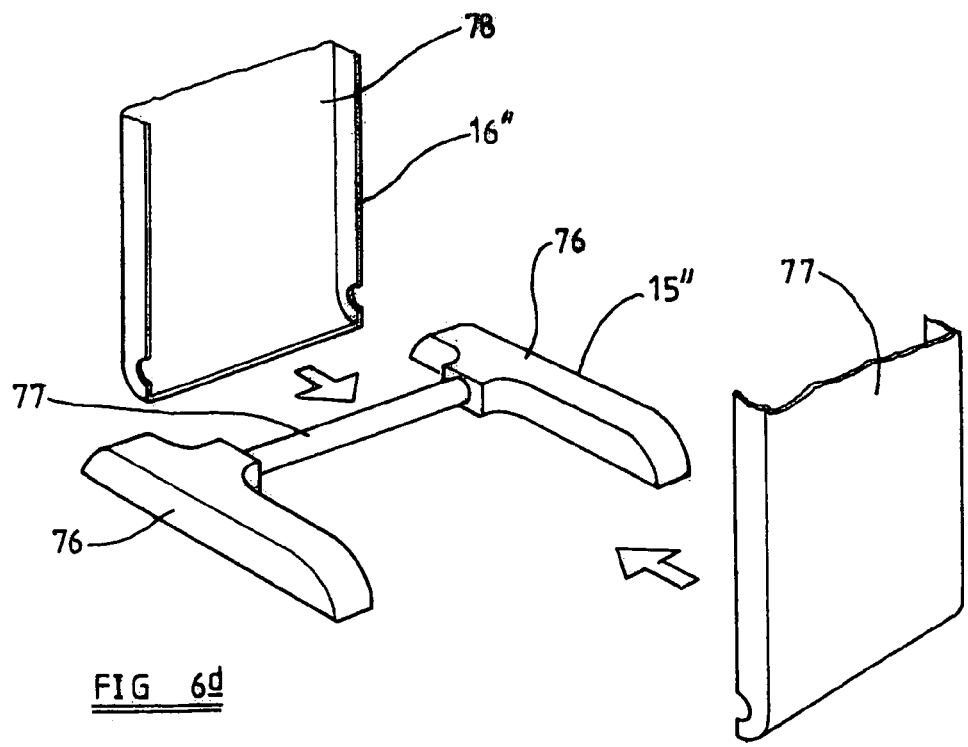
FIG. 6d is a perspective view of a still further support.

It will be apparent that any other assembly or a base part 15 and column 16 may be provided as desired. For example, as shown in FIG. 6c a column 16' is shown provided with a cylindrical apertures 74 at an end part thereof which engage a pair of feet 75 which together form a base part 15'. In FIG. 6d, a base part 15" comprises a pair of feet connected by a generally cylindrical connecting part 77, and a column 16" is formed by connecting two column parts 78 such that they enclose the connecting part 77 and permit relative rotational movement between base part 15" and column 16".

As shown in FIGS. 1 and 3, an upper surface 50 of the column 16 is provided with a screen engagement part to engage a display screen, in the present example a recess 50a. In the present example as shown in FIG. 1, the display screen 13 is provided with a screen support part having an arm 51 which is pivotally connected by a pivotal connection 52 to the display screen 13. At the opposite end of the arm 51, a pivotal connection 53 is provided connected to a lug 54 to engage the recess 50a. A recessed slot 51a is provided in the column 16 to at least partially receive the arm 51 to allow the display 11 to be folded as shown in FIG. 2a. In this example, the screen 13 is also provided with a portrait-landscape mechanism 55 whereby the screen may be rotated between portrait and landscape positions. The position of the pivotal connections 52 and 53 and the pivotal connection between the column 16 and base 14 allows the user to vary the height and position of the display screen 13 with a great deal of flexibility, while the engagement of the lug 54 and recess 50a permits the screen to rotate about an axis extending generally co-linear with the column 16.

As shown in FIGS. 2a to 2c, the display 11 may be moved from a folded configuration as shown in FIG. 2a where the arm 51 lies adjacent the display screen 13 and the column 16, and the base part 15 is folded to a position where it is relatively close to the column 16 to provide a relatively compact and more easily portable configuration. By pivoting the various components about the pivotal connections as shown in FIG. 2b, the display 11 can be unfolded to an erect, operational position as shown in FIG. 2c. It will be apparent that in the present example, it will be necessary to remove any modules 19, 20, 21, 22 to permit the base part 15 and column 16 to be pivoted such that they are relatively close to one another, unless the base part 15 is shaped such that the pivotal connection between the base part 15 and the column 16 is spaced away from the arms 14a, 14b such that the display screen 13 and the arms 14a, 14b.

To provide for additional height adjustment of the display screen 13, it might be envisaged that the column 16 may be telescopically extendible, or the connection between the arm 51 and the column 16 may itself be telescopic, for example by an appropriate extending configuration of the lug 54 or indeed by any other means as desired.

Figure 7:
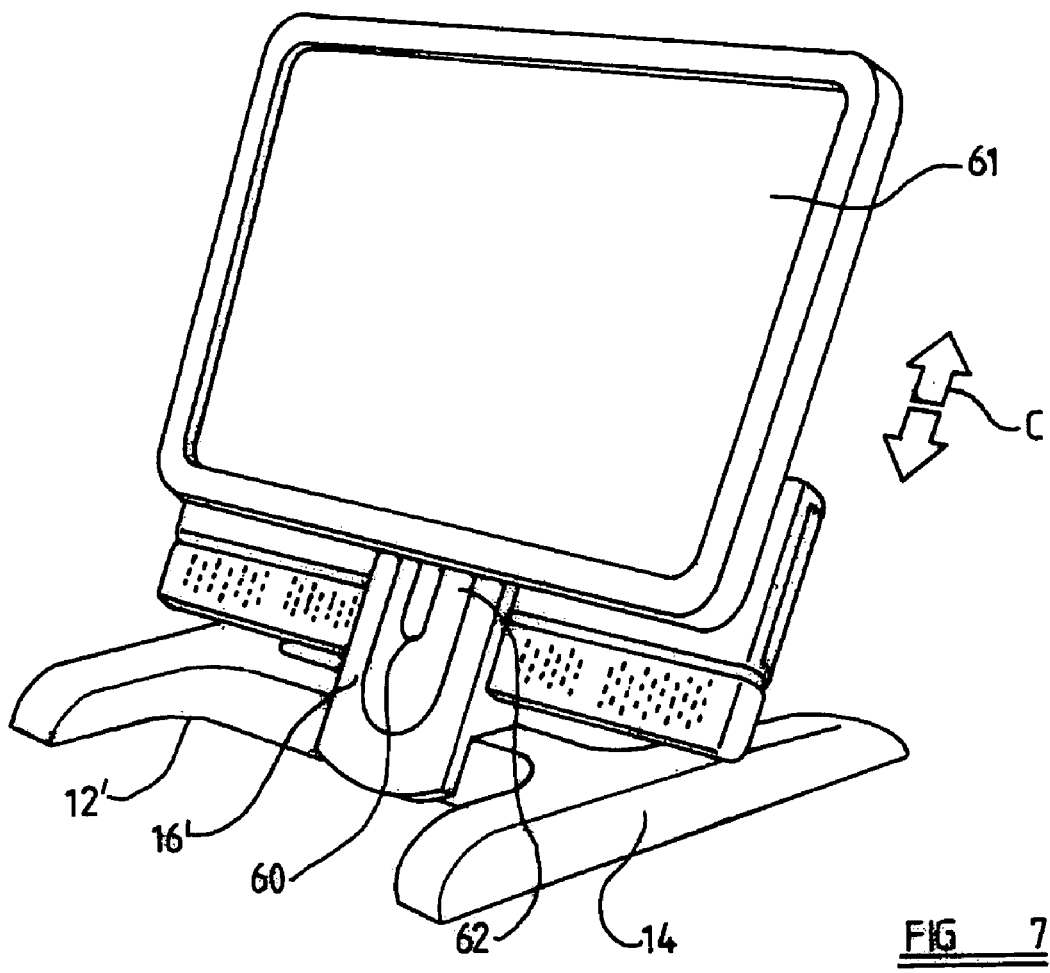
FIG. 7 is a perspective view from the front and to one side of a further display embodying the present invention.

In an alternative embodiment as shown in FIG. 7 a support 12' is shown having a base part 15' and a column 16'. The column 16' is provided with a screen support part comprising sliding connection 60 whereby the vertical height of a display screen 61 may be adjusted as shown by arrows C, in this example by providing connectors on the screen 61 (not shown) received in a vertically extending slot 62 provided on the column 16'. The column 16' and base part 15' are relatively pivotally movable in the manner to the embodiment of FIGS. 1 to 6 to permit the support 12' to be collapsed for carrying purposes.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A display for a computer system comprising a display screen and a support for supporting the display screen,
   the support comprising a base and a column attached to the base,
   the column being provided with a screen support part and with at least one connector to which a module of the computer system may be connected,
   wherein the column comprises a front face that faces the display screen, a back face that faces away from the display screen, and opposed side faces provided between the front face and the back face, and wherein a plurality of connectors are located on at least one of the opposed side faces, and
   wherein the plurality of connectors are disposed in a vertical, columnar arrangement on the column.

2. A display according to claim 1 wherein the connector is located such that when a module is connected thereto, the module is located at least partly behind the display screen.

3. A display according to claim 1 wherein at least one connector is connected to an output connection for communication with a processor unit of the computer system.

4. A display according to claim 1 wherein a power supply unit is located in a base module adjacent the column and behind the base.

5. A display according to claim 1 wherein the base comprises a pair of rearwardly extending arms interconnected by a forward part, and wherein the column is connected to the forward part.

6. A display according to claim 5 wherein the power supply module is adapted to be received in between the rearwardly extending arms.

7. A display according to claim 6 wherein the power supply module is adapted to supply power to the display screen and any modules connected to the support.

8. A display according to claim 1 wherein the column is foldably connected to the base.

9. A display according to claim 8 wherein the screen support part comprises a first rotating part located adjacent the column and a second pivotal connection in the vicinity of the screen whereby the support and screen support part may be folded into a collapsed configuration.

10. A display according to claim 1 wherein the column is provided with a screen support part comprising a sliding connection whereby the display screen is vertically slideable relative to the column.

11. A display according to claim 1 further comprising at least one module engaged with a connector on the support.

12. A display for a computer system comprising a display screen and a support for supporting the display screen,
    the support comprising a base and a column attached to the base,
    the column being provided with a screen support part and with at least one connector to which a module of the computer system may be connected,
    wherein the column comprises opposed side faces and wherein a plurality of connectors are located on each opposed side face.

13. A computer system comprising a display according to claim 1.

* * * * *